Dec. 12, 1967 M. GARBUNY 3,358,169

METASTABLE ION PINCH LIGHT SOURCE

Filed Jan. 25, 1963

WITNESSES
Theodore F. Wrobel
James F. Young

INVENTOR
Max Garbuny
BY
Charles F. Renz
ATTORNEY

United States Patent Office 3,358,169
Patented Dec. 12, 1967

3,358,169
METASTABLE ION PINCH LIGHT SOURCE
Max Garbuny, Penn Hills, Pa., assignor to Westinghouse Electric Corporation, Pittsburgh, Pa., a corporation of Pennsylvania
Filed Jan. 25, 1963, Ser. No. 253,806
4 Claims. (Cl. 313—63)

The present invention relates to high intensity radiation sources, and more particularly to high intensity radiation sources utilizing metastable ions.

An increasing demand for strong sources of visible and ultraviolet light has been felt in recent times. There is need for both continuous and pulse sources of high intensity light. This demand arises from a variety of needs, such as, for optical pumping of excited states for producing coherent radiation, and also from older applications as target ranging or other pulsed illumination purposes. Conventionally, pulsed light is produced by discharging a high voltage capacitor across a space containing atoms of a suitable gas. The energy so stored can be released in the order of microseconds. However, the radiation power available is limited by competing processes of energy conversion such as Joule heat. It is also limited by the amount of charge that can be stored in the capacitor without breakdown.

It is therefore an object of the present invention to provide a new and improved source of high intensity light, the term light including here and in the following infrared, visible, and ultraviolet radiation.

It is a further object of the present invention to provide a new and improved source of high intensity pulsed light utilizing ions in their metastable state.

It is a further object of the present invention to provide a new and improved source of continuous light utilizing ions in their metastable energy state.

It is a further object of the present invention to provide a new and improved source of high intensity pulsed radiation between the X-ray region and the infrared part of the spectrum using the energy stored in metastable states of ions.

Broadly, the present invention provides a method and apparatus for providing a source of high intensity electromagnetic radiation wherein metastable ions are accelerated by an electric field and then caused to collide by the application of a magnetic field releasing their energy in the form of radiation.

These and other objects will become more apparent when considered in view of the following specification and drawings, in which.

Metastable atoms, that is, atoms in excited states from which radiation transitions to the ground state are forbidden, have a considerably higher energy storage capacity than do ordinary atoms. Atoms in their ordinary excited states return to the ground level typically within $10^{-8}$ seconds. Metastables, however, carry their energy of excitation a much longer time, to the order of $10^{-2}$ seconds and longer. The energy of the metastable is released only by indirect processes such as by collision processes with other metastables or with atoms in the ground state. A large percentage of the released energy from collision may appear more or less directly as light, such as in the argon-mercury mixture of fluorescent lamps. Typically such mechanisms are "collisions of the second kind" in which the energy of the metastable is converted into excitation of a foreign atom which then decays by emission of light. However, there is difficulty in storing large amounts of energy of this type and releasing it in pulsed form in that metastables at high densities will collide very frequently and release their energy prematurely due to collision. If metastables are created at low densities and then forced during the duty cycle into high concentration by suitable focusing methods, such as the magnetic pinch effect, light may be generated by this process of storage and release of metastable energy.

The magnetic pinch effect consists of the radial constriction or focusing that a column of charged moving particles experiences when an axial magnetic field is applied thereto. Therefore the preferred operation is that of exciting ions to metastable states. There are, however, related alternatives in a mixture of ions and neutral atoms interchange of charge and kinetic energy occurs at a rate which depends on density. It is therefore possible for ions which are not in metastable states to transfer their charge to neutral atoms which are in metastable states with subsequent release of radiation energy. This process, however, will be less efficient.

Figure 1:
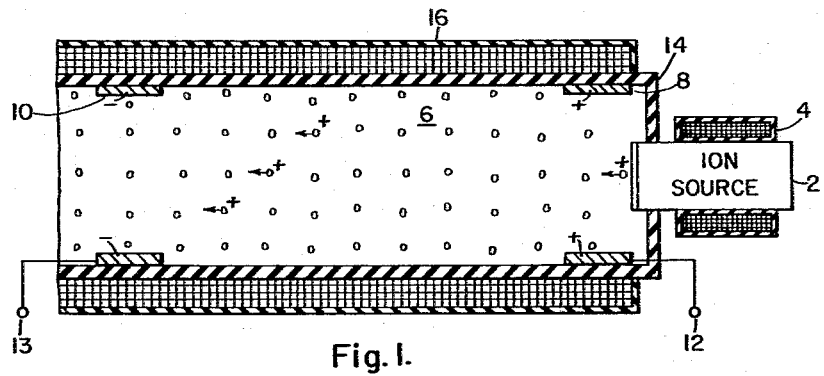
FIGURE 1 is a cross-sectional view of one embodiment of the present invention without a magnetic field being applied.

Referring to FIGURE 1, a light source is shown in which the above process may be performed. An ion source 2 provides a supply of metastable atoms, which may be, for example, single ionized alkali atoms. Singly charged ions such as of lithium ($Li^+$), sodium ($Na^+$), potassium ($K^+$) . . . have the electron configurations of the respective inert gases namely helium, neon, argon. . . . These alkali ions are capable of being excited into various metastable energy states which correspond to those of the inert gases except for a factor of four in energy. By storing energy in the ion stream, the energy may later be released as light. The ions may be produced and excited into the metastable state by various means.

In the present example, an RF coil 4 is shown disposed around the ion source 2 to supply radio frequency energy and thus to ionize the alkali atoms and to excite the ions into metastable states. Also, suitable arcs and electron bombardment may be used to provide the necessary excitation. The ions in metastable states are introduced into the chamber 6 where they are accelerated by an electric field. The electric field is supplied by the electrodes 8 and 10, the electrode 8 being positive; the electrode 10 negative. The electrodes 8 and 10 are energized from suitable potential sources, not shown, through the terminals 12 and 13. Thus, a stream or flow of positive metastable ions is provided in the chamber 6 flowing from the positive electrode 8 toward the negative electrode 10.

The chamber 6 is enclosed through a suitable insulating vessel 14, which may be made of any suitable insulating material. About the insulating vessel 14 is disposed a magnetic coil 16. The magnetic coil 16, in FIGURE 1, is not energized, that is, no magnetic field is provided in the chamber 6. Thus, the ions supplied from the ion source 2 enter the chamber and scatter to be at a low density. Under these conditions, few collisions occur between the metastable ions. Therefore, the metastables will not release their energy prematurely, but will proceed along the chamber, being accelerated due to the effect of the electric field supplied.

Figure 2:
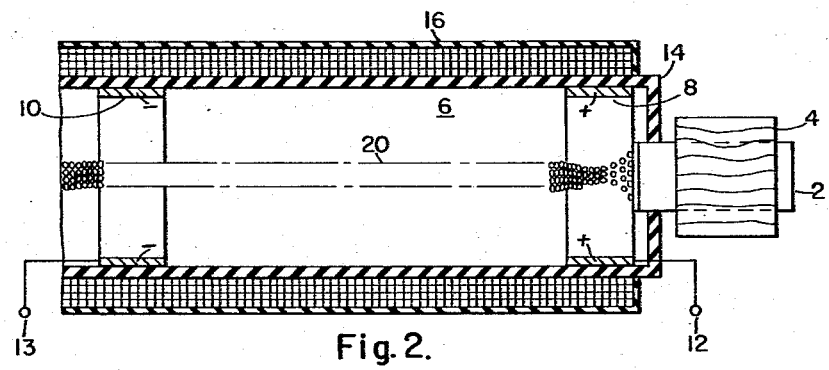
FIG. 2 is a cross-sectional diagram of the embodiment of FIGURE 1 with a magnetic field being applied.

When the magnetic coil 16 is excited, by a suitable source, not shown, a magnetic field will be provided in the axial direction of the chamber 6. Thus, due to the pinch effect, the metastable ions will be forced into the constricted configuration 20, as shown in FIGURE 2. Because of the resulting high density, the stream of ions now being condensed into a relatively small diameter 20, the metastables collide and a large amount of energy is released in a relatively short time; thus providing a strong pulse of light. There are, of course, a great number of alternatives by which the energy stored in the metastables can be released. Moreover, by proper choice of gases or the mixture of gases, the total energy should be able to be released as visible or ultraviolet range in a relatively small wavelength interval.

Figure 3:
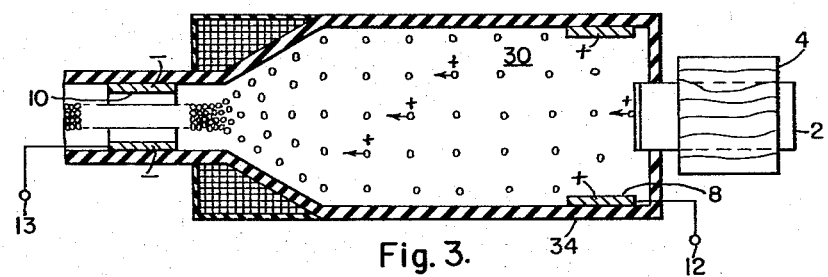
FIG. 3 is another embodiment of the present invention providing a continuous light source.

FIGURE 3 shows an embodiment by which a continuous source of high intensity light may be provided. The chamber 30 is shaped so that the end 36, opposite the source of ions, is constricted to a smaller diameter. A magnetic coil 32 is disposed about the insulating wall 34 at the constricted end of the chamber 30 and is continually excited to provide an axial field through the constricted portion 36 of the chamber 30. Thus, the ions in the metastable states are accelerated from the ion source 2 by the electrodes 8 and 10 toward the constricted area 36. As the ions pass through the constricted area 36 and under the effect of the magnetic field from the magnetic coil 32, the ion density has increased to such an extent that there are collisions to cause the ions to release their metastable energy continuously in the form of light. Thereby, a continuous source of high intensity light is provided.

Figure 4:
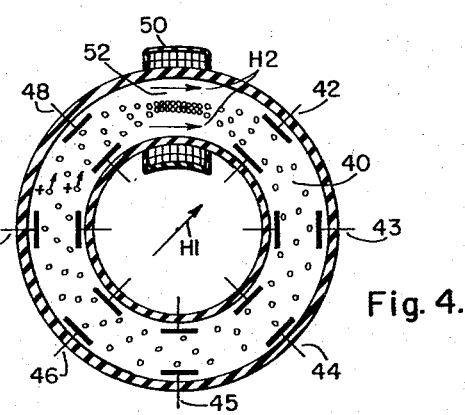
FIG. 4 is a schematic diagram of another possible embodiment of the present invention.

FIGURE 4 shows an annular shaped chamber 40 in which metastable ions are introduced or generated by means, not shown, and then accelerated around the annulus due to the electrodes 42 through 48. The potentials applied to the electrodes are such that the resulting electric field drives the ions in a "doughnut" orbit. Alternatively, a rotating magnetic field $H_1$ in the radial direction of the doughnut may be used to force the ions into a circular orbit. A magnetic coil 50 is disposed about the chamber 40 at area 52. By the application of a longitudinal magnetic field $H_2$ from the coil 50, the potential energy stored by the metastables in the entire ring may then be released in the pinch region 52 at a rate proportional to the ion velocity; thus providing a high intensity source of light.

The energy stored in metastables such as of lithium +, sodium +, potassium + . . . is the order of 50–100 electron-volts or $10^{-17}$ Joules per particle. Thus at a density of $10^{-13}$ metastables per centimeter cubed, a cylindrical section of a meter length and diameter contains about 100 Joules of metastable energy. In such a configuration, sizable powers of radiation may be obtained for large ion velocities.

Although the present invention has been described with a certain degree of particularity, it should be understood that the present disclosure has been made only by way of example and that numerous changes in the details of construction, the combination and arrangement of parts may be resorted to without departing from the scope and spirit of the present invention.

I claim as my invention:

1. A high intensity electromagnetic radiation source comprising, an ion supply source for providing a flow of ions, means for exciting said ions to metastable energy states to provide a flow of metastable ions, means for producing an electric field to accelerate said flow of metastable ions, and magnetic means to apply a magnetic field to said flow of metastable ions to constrict the flow and cause the ions to release energy in the form of electromagnetic radiation.

2. A high intensity electromagnetic radiation source comprising, a chamber, an ion supply source for providing a flow of ions, means for exciting said ions to metastable energy states to provide a flow of metastable ions and introducing said flow of metastable ions into one end of said chamber, electrode means disposed along said chamber for producing an electric field to accelerate said flow of metastable ions through said chamber, and a magnetic coil disposed about the said chamber to apply a magnetic field to said flow of metastable ions as it passes therethrough to constrict said flow of metastable ions causing the metastable ions to collide and release energy in the form of electromagnetic radiation.

3. A high intensity light source comprising, a chamber having a passage therethrough, an ion supply source for providing a flow of ions, means for exciting said ions to metastable energy states to provide a flow of metastable ions and introducing said flow of metastable ions into one end of said chamber, electrodes disposed along said passage for producing an electric field to accelerate said flow of metastable ions through said passage, and a magnetic coil disposed about said chamber to apply at predetermined times a magnetic field axially to said flow of metastable ions as it passes through said passage to constrict said flow of metastable ions causing the metastable ions to collide and release energy in the form of light.

4. A continuous high intensity electromagnetic radiation source comprising, a chamber having a shaped cross section with one end being constrictive to a flow passing therethrough, an ion supply source for providing a flow of ions, means for exciting said ions to metastable energy states to provide a flow of metastable ions and introducing said flow of metastable ions into said chamber at the unconstricted end, electrodes disposed along said chamber for producing an electric field to accelerate said flow of metastable ions along said chamber, and a magnetic coil disposed about the constricted end of said chamber to apply a magnetic field to said flow of metastable ions as it passes therethrough to further constrict said flow of metastable ions causing the metastable ions to collide and release energy in the form of electromagnetic radiation.

References Cited

UNITED STATES PATENTS

| | | | |
|---|---|---|---|
| 933,094 | 9/1909 | Moscicki | 313—161 X |
| 2,997,436 | 8/1961 | Little et al. | 313—161 X |
| 3,015,745 | 1/1962 | Klein | 313—63 |
| 3,038,099 | 6/1962 | Baker et al. | 313—161 X |
| 3,170,841 | 2/1965 | Post | 315—111 X |

DAVID J. GALVIN, *Primary Examiner.*

ROBERT SEGAL, *Examiner.*

GEORGE WESTBY, D. E. SRAGOW,
*Assistant Examiners.*